United States Patent
Ieki

[19]

[11] Patent Number: 5,981,942
[45] Date of Patent: Nov. 9, 1999

[54] OPTICAL ENCODER FOR DETECTING RELATIVE DISPLACEMENT BASED ON SIGNALS HAVING PREDETERMINED PHASE DIFFERENCES

[75] Inventor: Atsushi Ieki, Gifu, Japan

[73] Assignee: Okuma Corporation, Aichi, Japan

[21] Appl. No.: 08/955,293

[22] Filed: Oct. 21, 1997

[30] Foreign Application Priority Data

Oct. 25, 1996 [JP] Japan .................................. 8-284255

[51] Int. Cl.⁶ .............................. H01J 40/14; G01D 5/36
[52] U.S. Cl. .................................. 250/231.16; 250/237 G
[58] Field of Search ..................... 250/231.13, 231.14, 250/231.16, 237 G, 237 R; 356/356; 359/566, 569

[56] References Cited

U.S. PATENT DOCUMENTS 5,748,373 5/1998 Hane et al. ........................ 250/237 G
5,750,984 5/1998 Ieki ..................................... 250/237 G

*Primary Examiner*—Edward P. Westin
*Assistant Examiner*—Kevin Pyo

*Attorney, Agent, or Firm*—Wenderoth, Lind & Ponack, L.L.P.

[57] ABSTRACT

The optical encoder is capable of detecting phases at positions which coincide more strictly than the phase detecting positions of a conventional optical encoder, and is thereby capable of outputting less distorted displacement signals with a sufficient averaging effect and detecting the phases more accurately. An amount of a light having passed through a first grating is received directly with a light receiving section and output as an electric signal. On the basis of the fact that the electric signal is varied dependently on a relative displacement between the first grating and the light receiving section, the relative displacement is detected. The light receiving section includes a plurality of grating-like photo detecting devices which have fine widths and are arranged in a grating-like shape in a mixed manner within a minute section so as to correspond to four phases. Further, the photo detecting devices are composed of divided and minute photo detecting elements so as to have widths which are not definite but have such values as to eliminate the distorted component of high orders.

4 Claims, 7 Drawing Sheets

OPTICAL ENCODER FOR DETECTING RELATIVE DISPLACEMENT BASED ON SIGNALS HAVING PREDETERMINED PHASE DIFFERENCES

BACKGROUND OF THE INVENTION

1. Field of the Invention

The present invention relates to an optical encoder which is utilized for measuring positions of machine tools and semiconductor manufacturing systems.

2. Description of the Prior Art

An optical encoder comprises a light emitting unit which emits a light beam and photoelectric converting elements which are disposed behind two diffraction gratings. The optical encoder and detects light having passed through the two diffraction gratings with the photoelectric converting elements, thereby detecting a moving distance on the basis of a variation of a light intensity caused due to a relative movement between the two diffraction gratings.

Generally speaking, a diffraction grating is composed of transmissive portions allowing transmission of the light and non-transmissive portions not allowing transmission of the light which are arranged alternately. An arrangement pitch of the two portions is referred to as a grating pitch, and each of the transmissive portions and the non-transmissive portions has a width equal to ½ of a grating pitch P.

In an encoder which uses two diffraction gratings, a transmission light amount has a miaximum value and an output detected with the photoelectric converting element also has a maximum value when the transmissive portions of the gratings are matched with each other. Further, the transmission light amount has a minimum value and the output detected with the photoelectric converting elements also has a minimum value when the transmissive portions of one of the diffraction grating are matched with the non-transmissive portions of the other diffraction grating. An electric signal outputted from the photoelectric converting element varies between the maximum value and the minimum value dependently on relative displacements between the two diffraction gratings. When the two diffraction gratings are displaced at an equal speed relative to each other, an output signal obtained with the photoelectric converting element should ideally be a triangular wave signal having a period P. In actuality, however, the triangular wave signal is distorted under influences due to diffraction and so on. The detection of relative displacements has conventionally been carried out while regarding the triangular wave signal as a sinusoidal wave.

Figure 1:
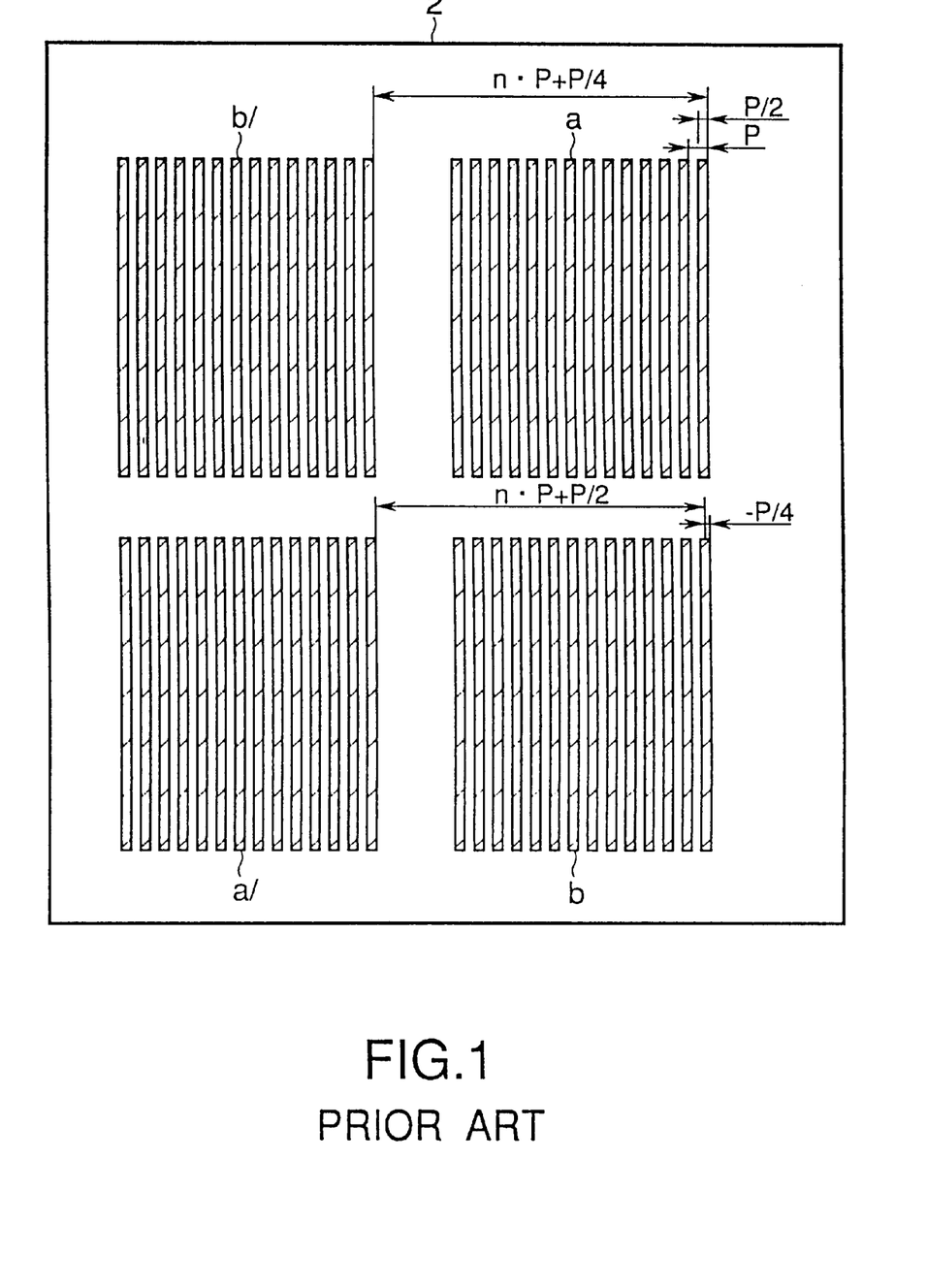
FIG. 1 is a diagram exemplifying a second grating used in a conventional optical encoder.

Furthermore, the optical encoder which has the conventional configuration uses a second grating 2 such as that shown in FIG. 1 as a second diffraction grating (hereinafter referred to as a "second grating") which is to be disposed behind a first diffraction grating (hereinafter referred to as a "first grating"). Since different phases are detected at different locations which are apart from one another on the first grating for detecting a position, the optical encoder has a problem that it allows signals to be unbalanced under influences due to stains, damage or errors on the scale, thereby producing measuring errors. The optical encoder further has another problem in that it allows signals of the different phases to be varied due to variations of parallelism or intensity of a light beam from a light source.

For preventing crosstalk between lights having different phases, it is necessary to reserve spaces between each phase of photo detecting devices on the second grating and a light receiving section, thereby enlarging the optical encoder.

Figure 2:
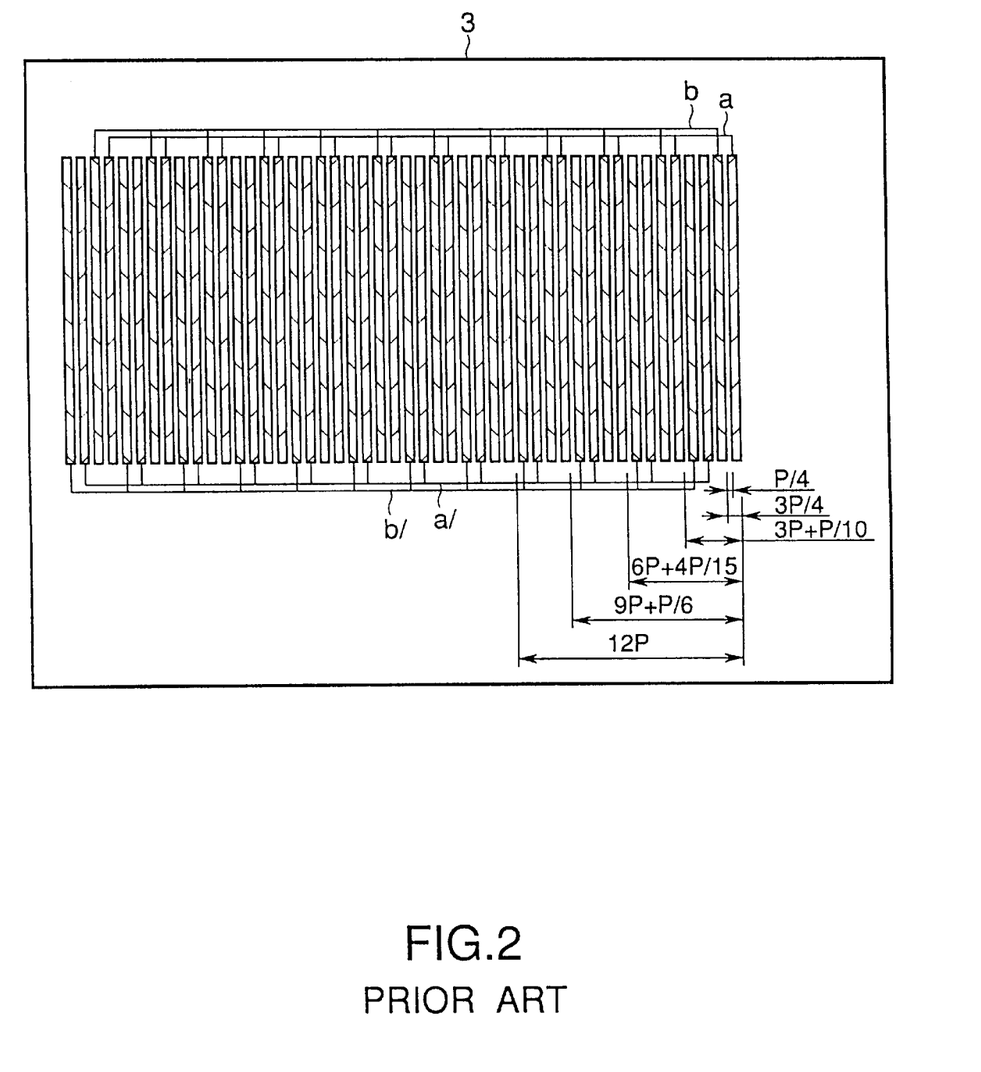
FIG. 2 is a diagram exemplifying a light receiving section used in the conventional optical encoder.

For solving the above problems, Japanese Patent Application Laid-open No. 8-201117 discloses an optical encoder in which light having passed through a first grating is received directly with photo detecting devices arranged in a shape of a grating. In this optical encoder, the photo detecting devices are arranged in a light receiving section 3 so as to form a grating as shown in FIG. 2. Since the photo detecting devices for different phases are mixed in the shape of the grating on photoelectric converting elements, the optical encoder is capable of detecting the different phases at positions which are substantially the same. Therefore, the optical encoder is capable of detecting displacements with a higher accuracy than the optical encoder which uses such the second grating 2 such as that shown in FIG. 1 even when signals are under influences due to stains, damage or errors on a scale or when parallelism or intensity of a light beam from a light source is varied.

When the stains, damage and errors are caused on the scale at intervals which are nearly equal to a pitch of scales, however, signals of one phase only are influenced by the stains, damage or errors, thereby causing errors in detection of the positions.

In the light receiving section 3 shown in FIG. 2, the photo detecting devices are arranged not at intervals which are definite but with predetermined phase differences so as to eliminate higher harmonic components of high orders such as third and fifth orders for precise positional detection with distorted components eliminated. For eliminating the distorted higher harmonic components, for example, of the third and fifth orders, however, it is necessary to arrange at least four photo detecting devices. Though a sufficient averaging effect is exhibited regardless of uniformity of an illumination light beam when the photo detecting devices are arranged in a sufficiently large number, there is posed a problem that the averaging effect is lowered and the capability to eliminate the distorted higher harmonic components of the third and fifth orders is degraded when a grating has a small number of slits, for example, four to several slits.

SUMMARY OF THE INVENTION

The present invention has been achieved in view of the circumstances described above and has a primary object to provide an optical encoder which is capable of detecting phases at positions coincided more strictly than the phase detecting positions of the conventional optical encoders, thereby stably outputting less distorted displacement signals with a sufficient averaging effect.

The present invention relates to an optical encoder which comprises a scale and photo detecting devices displaced relative to the scales. The optical encoder detects relative displacements of the photo detecting devices on the basis of signals having predetermined phase differences which are provided from the photo detecting devices. The object of the present invention described above can be accomplished by configuring an optical encoder comprising photo detecting device groups which are composed by arranging a plurality of the photo detecting devices in a longitudinal direction of the scale in correspondence to a pattern period of the scale so as to correspond to a plurality of signals having the predetermined phases, wherein the photo detecting devices belonging to one of the photo detecting devices groups and the photo detecting devices belonging to another one of photo detecting device groups are arranged such that they are mixed in the longitudinal direction. The photo detecting devices belonging to the photo detecting device group and the photo detecting devices belonging to the other photo detecting device group are arranged so that a signal obtained with the photo detecting device group and a signal obtained with the other photo detecting device group have a predetermined phase difference. Each of the photo detecting devices composing a photo detecting device group corresponding to a signal of a phase is divided into at least two photo detecting elements in the longitudinal direction. A width W of a photo detecting device composed of the divided photo detecting elements corresponds to a width of a pattern in the longitudinal direction of the scale and a photo detecting device pattern is determined so that Fourier components of high orders are not included in Fourier components of an arrangement distribution of photo detecting device pattern composed of the divided photo detecting elements.

In the configuration described above, the width of the photo detecting device corresponding to the pattern width of the scale is divided at least into two in an arrangement not requiring the second scale. Further, the optical encoder having this configuration is capable of detecting different phases at positions which can be regarded as substantially the same. Therefore, the optical encoder has a merit that it equalizes influences among the different phases and does not allow output signals to be unbalanced even when stains, damage or errors are caused on the scale at intervals close to a pitch of the scale, thereby causing no error in positional detection. This optical encoder has another merit in that the positional detection is hardly affected by variations of parallelism or intensity of a light beam from a light source as well as errors on the scale.

Furthermore, the configuration makes it possible to provide stable signals stably with a sufficient averaging effect since the distorted components of the high orders can be eliminated by the widths of the photo detecting devices and less distorted displacement signals can be obtained with a small number of photo detecting devices.

DESCRIPTION OF THE PREFERRED EMBODIMENTS

Now, description will be made of preferred embodiments of the present invention.

Figure 3:
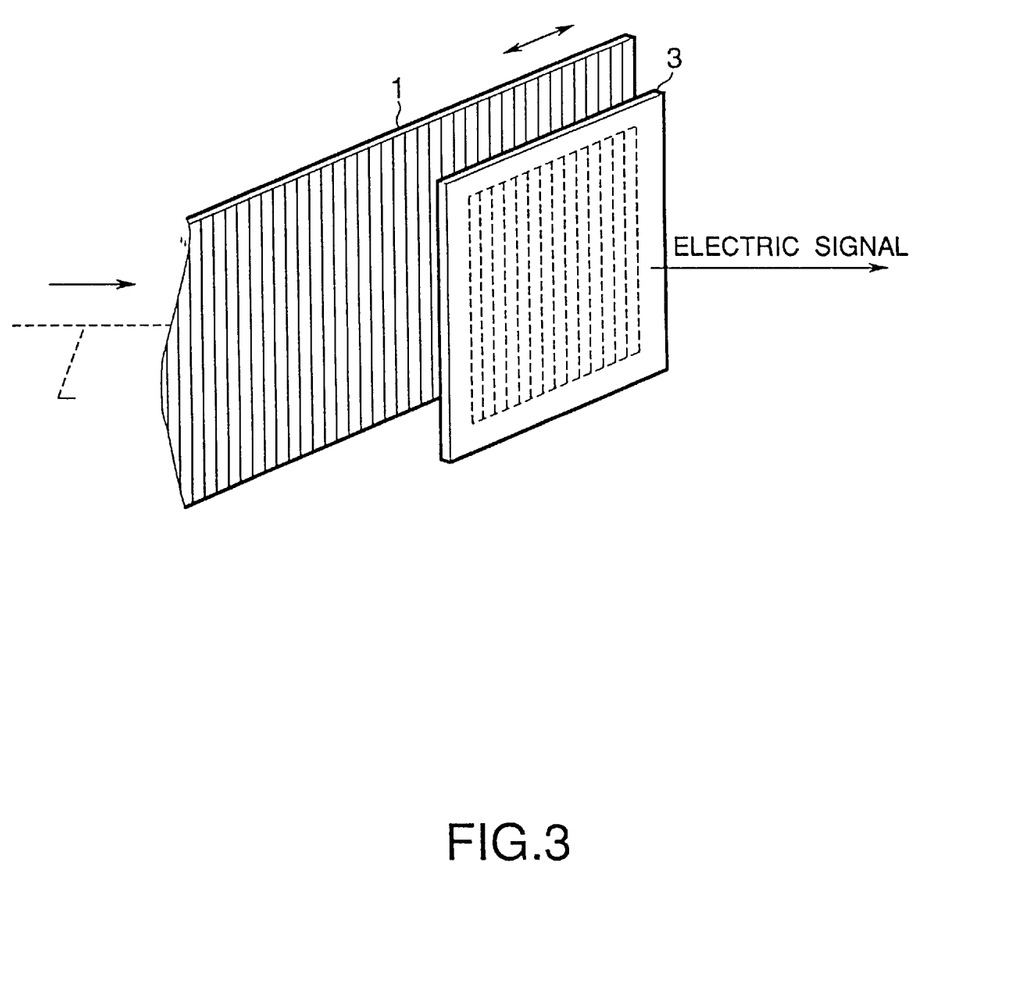
FIG. 3 is a perspective view illustrating a configuration of an embodiment of the optical encoder according to the present invention.
Figure 4A:
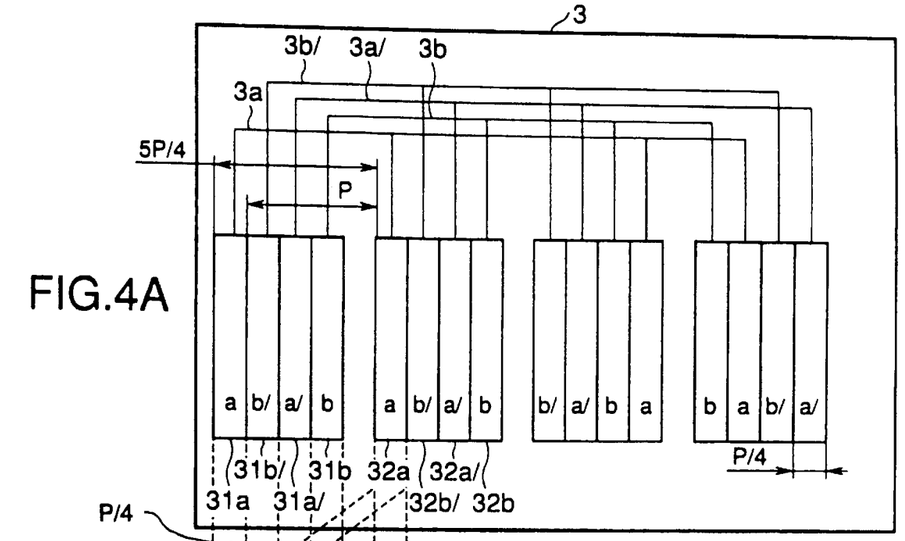
FIGS. 4A to 4E are diagrams showing a first example of a light receiving section used in the embodiment of the present invention shown in FIG. 3.

FIG. 3 is a perspective view illustrating a configuration of an encoder preferred as a first embodiment of the present invention. The encoder preferred as the first embodiment comprises a scale (first grating) 1 which first receives a light from a light source, and a light receiving section 3 composed of photo detecting devices, etc. The photo detecting devices move relative to the first grating 1 in directions indicated by the double-headed arrow in the drawing and receive light transmitted through the first grating 1 and output electric signals corresponding to the amount of light. The photo detecting devices of the light receiving section 3 are arranged in a shape of a grating as shown in FIG. 4A. The photo detecting devices of the light receiving section 3 shown in FIG. 4A are arranged at intervals of several $\mu$m to hundreds of $\mu$m on average. This arrangement pattern is to be used for an optical encoder which outputs signals of four phases a, b, a/ and b/ (0°, 90°, 180° and 270°) from photo detecting device groups 3a, 3b, 3a/ and 3b/ respectively. Further, these photo detecting device groups have photo detecting devices which are spaced apart as illustrated by 31a and 32a, 31b and 32b, 31a/ and 32a/, 31b/ and 32b/, respectively.

In the embodiment shown in FIGS. 4A to 4E, the photo detecting device has a width P/4 when a pitch of the first grating 1 is represented by P. A photo detecting device group for a phase "a" is composed of the spaced apart elements (i.e., photo detecting devices) 31a and 32a which are spaced apart in the amount of the pitch P or an integral times thereof, and have a total combined width of P/2. The photo detecting device 31b/ for a signal "b/" is disposed adjacent to the photo detecting device 31a for the phase "a", the photo detecting device 31a/ for a signal "a/" is disposed adjacent to the photo detecting device 31b/ for the signal "b/" and the photo detecting device 31b for a signal "b" is disposed adjacent to the photo detecting device 31a/ for the signal "a/", whereby the photo detecting device groups for the four phases are disposed alternately. The arrangement pattern is composed by repeating this arrangement as a cycle and has a period of 5P/4.

Figures 4B, 4C:
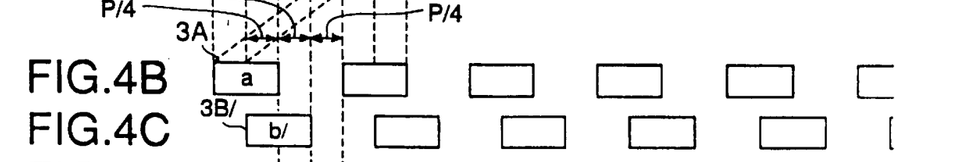
Figure 4D:
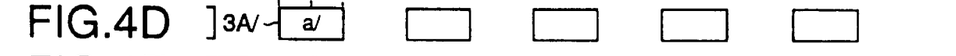
Figure 4E:
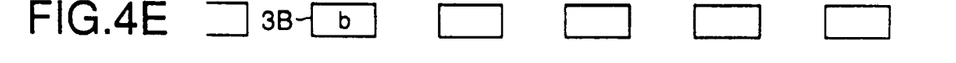

The embodiment utilizes the fact that a sum of signals obtained from the photo detecting devices 31a and 32a for the phase "a", for example, out of the photo detecting device groups shown in FIG. 4A is equivalent to a signal which is obtained with a photo detecting device 3A shown in FIG. 4B. Further, a sum of signals obtained from the photo detecting devices 31b and 32b for the phase "b" is equivalent to a signal obtained with a photo detecting device 3B shown in FIG. 4E. Signals equivalent to those from photo detecting devices 3A/ and 3B shown in FIGS. 4D and 4C are obtained similarly.

When a light intensity at each point on the photo detecting device obtained through transmission and defraction through the first grating 1 is represented by I (x, z), a light intensity I obtainable with the photo detecting device a; a whole in the configuration shown in FIG. 3 is expressed as I ∫ I (x,z) dx (wherein an integration range is a range of light receiving portions of the photo detecting device in a longitudinal direction). This light intensity is quite different from a light intensity which is obtained with a general encoder using two diffraction gratings.

Figure 5:
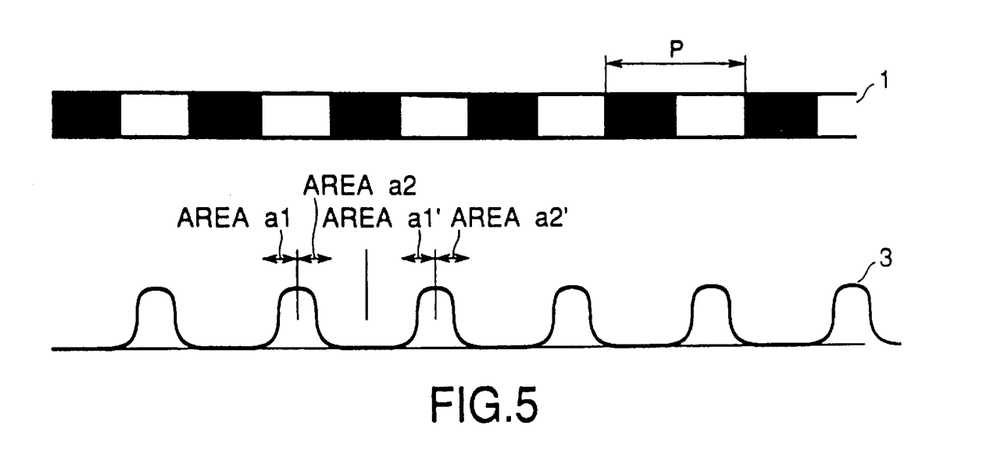
FIG. 5 is a diagram descriptive of the embodiment shown in FIG. 4.

Further, the same slit is arranged repeatedly at the period P in the first grating 1. Accordingly, the same light intensity is repeated at the period P also on each point of the light receiving section 3. An image of the light intensities is illustrated in FIG. 5, wherein the light intensities at areas a1 and a2 are equivalent to those at areas a1' and a2' respectively. Accordingly, a signal obtained with the photo detecting device group of 31a and 32a shown in FIG. 4A (an integral of I (x, z) in sections of 31a and 32a) is equal to a signal obtained with the photo detecting device group 3A shown in FIG. 4B (an integral of I (x, z) in a section of 3A).

Similarly, signals which are obtained with the photo detecting device groups of 31b and 32b, 31a/ and 32a/, and 31b/ and 32b/ are equal to signals obtained with the photo detecting device group 3B, 3A/ and 3B/ respectively, and have phases which are different at intervals of 90 degrees. The embodiment which comprises the fine photo detecting devices for the four phases are arranged within a section having the minute width of 5P/4 equalizes influences on the different phases and does not allow output signals to be unbalanced even when stains, damage or errors are caused on the scale at intervals close to the pitch of the scale, thereby causing no error in positional detection due to such influences. Further, the positional detection can hardly be affected by variations of parallelism and intensity of a light from a light source or errors on the scale.

Since the photo detecting devices for different phases are mixed at positions which are substantially the same, (i.e., positions which are relatively close together), the photo detecting devices for different phases are irradiated with light having an equal intensity and the photo detecting devices have uniform characteristics, whereby the embodiment permits carrying out stable and highly accurate positional detection which can hardly be affected by influences due to stains, or damage on the first grating 1. Further, it is possible to connect the photo detecting devices to one another so as to obtain a difference between Ia and Ia/ and a difference between Ib and Ib/. In this case, direct current components which cannot be eliminated by the conventional configuration due to an unbalanced relationship among different phase signals are cancelled by one another, thereby making it possible to obtain only alternating current components wi th high accuracy. Though the photo detecting devices which are adjacent to each other are arranged with a gap of 3P/4 reserved therebetween, this gap may be 5P/4 or a different gap. A pattern may be formed by locating 31a directly on the right side of 32b and repeating 31a through 32b. Further, it is possible to configure so as to obtain signals of two phases or signals of three phases having phase differences at intervals such as 120 degrees.

Description will now be made of a second embodiment. An optical encoder preferred as the second embodiment uses a light receiving section 30 shown in FIGS. 6A to 6E which is obtained by improving the light receiving section 3 of the first embodiment.

In the second embodiment, a pattern of photo sensors comprised in the light receiving section 30 have widths which are not constant. A photo detecting device group for a phase is composed of a divided elements 31a, 32a, 33a and 34a. The elements 31a and 32a are separated by a distance of a period P or an integral times thereof. Divided elements 33a and 34a are also disposed similarly. The elements 31a and 32a have a total width of 13P/30, whereas the elements 33a and 34a have a total width of 7P/30. When these widths are selected for the photo detecting devices, Fourier components of high orders, or the third and fifth orders, are not included in an arrangement distribution of a photo detecting device pattern. The arrangement distribution of the photo detecting device pattern is a function of a location x in the longitudinal direction which is, for example, a distribution function when an area of the photo detecting device which receives the light is taken as "1" and an area of the photo detecting device which does not receive the light is taken as "0".

When the light which has passed through the first grating 1 is received directly with the photo detecting devices arranged in a shape of a grating, light intensity signals obtained with the photo detecting devices are proportional to transmittance 1Ck of the first grating 1 and a Fourier coefficient 2Ck of the arrangement distribution of the photo detecting device pattern. Since the arrangement distribution of the photo detecting device pattern shown in FIGS. 4A to 4E includes distorted Fourier components of high orders such as the third and fifth orders, a signal Ia includes these components and is distorted. When the photo detecting devices shown in FIGS. 6A to 6E are used, in contrast, Fourier components of the high orders such as the third and fifth orders are not included in the arrangement distribution of the photo detecting device pattern, whereby Fourier components of the high orders, or the third and fifth orders are not included in a light intensity signal Ia obtained with the photo detecting device.

For eliminating the distorted components of the third and fifth orders at the same time, it is possible to use another combination of widths, or any one of combinations of 17P/30 and 23P/30, 11P/30 and 29P/30, P/30 and 19P/30. Further, it is possible to select four widths as a combination of the values mentioned above. Signals obtained from the photo detecting device groups, for example, 3a, do not include the distorted components of the third and fifth orders. Signals obtained from the photo detecting device groups 3b, 3a/, 3b/ also do not include the distorted components of the third and fifth orders. Further, signals which have the phase differences at intervals of 90° are obtained from the photo detecting device groups 3a, 3b, 3a/ and 3b/.

Furthermore, the signal Ia does not include components of even orders and k has only an odd value when transmittance 1Ck of the first grating 1 and Fourier coefficient 2Ck of the photo detecting device pattern do not include components of even orders. In contrast to the configuration of the conventional optical encoder which uses the two diffraction gratings and allows the components of the even orders to be included in the signals due to the diffraction at the two stages, the configuration according to the present invention provides a merit that it is possible to obtain signals which do not include the components of the even orders.

Moreover, it is possible to eliminate Fourier components of optional "a" and "b" orders by selecting, in place of the widths of the photo detecting devices mentioned above, widths 2L or 2L' which satisfy the following equation (1):

$$\left.\begin{array}{l}2L = p(n/a + 1(1+2m)/2b) \\ 2L' = p(n/a - (1+2m)/2b)\end{array}\right\} \quad (1)$$

where the reference symbols 2L and 2L' represent widths of the photo detecting devices, the reference symbols n and m designate integers within a range from $-\infty$ to m designate integers within a range from $-\infty$ to $\infty$ and the reference symbols "a" and "b" denote ordinal numbers of Fourier components to be eliminated.

The second embodiment in which the fine photo detecting devices for the four phases are mixed within the section having a width of 5P/4 equalizes influences on the different phases and does not allow output signals to be unbalanced even when stains, damage or errors on a scale are caused at narrow intervals, for example, close to a pitch of a scale, thereby preventing the errors from being produced in the positional detection due to the influences. Further, the second embodiment in which the divided fine photo detecting devices have two widths so as to eliminate the distorted components of the third and fifth orders at the same time is capable of providing pure sinusoidal wave signals with a remarkably high averaging effect and stable detection signals due to a multiplicative effect obtained with the fine photo detecting devices of four phases which are arranged in a mixed fashion. Further, the second embodiment allows spaces which are wider than those in the light receiving section 3 shown in FIG. 4A to be reserved among the photo detecting devices, thereby providing merits such as reducing crosstalk among the photo detecting devices.

Figure 6A:
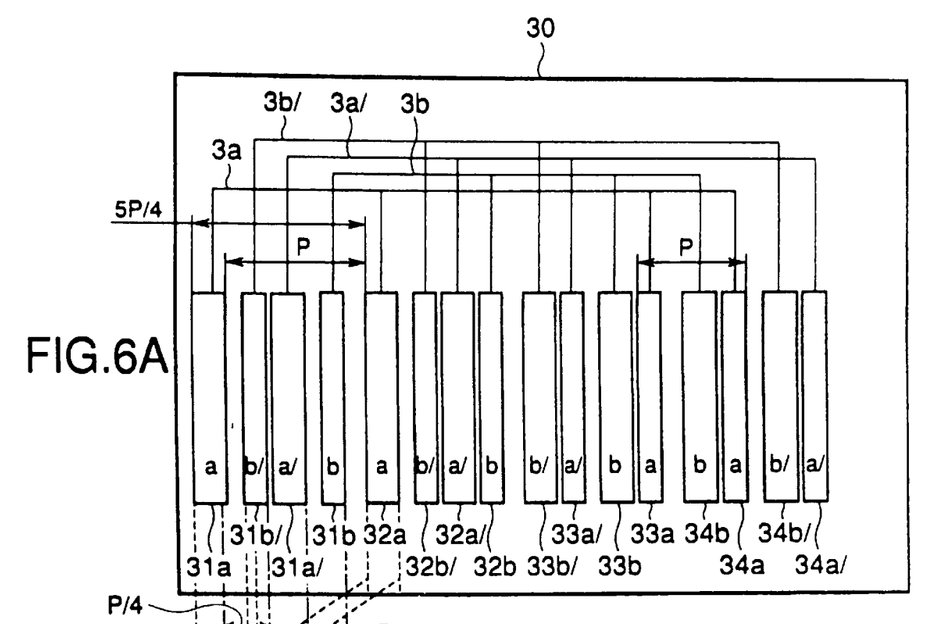
FIGS. 6A to 6E are diagrams showing a second example of a light receiving section used in the embodiment shown in FIG. 3.
Figures 6B, 6C:
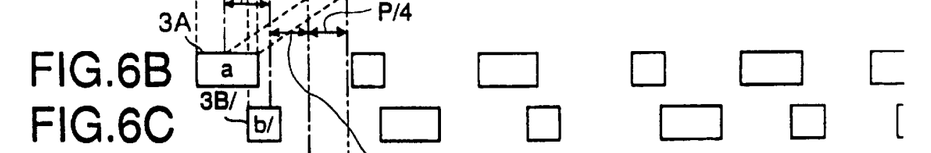
Figure 6D:
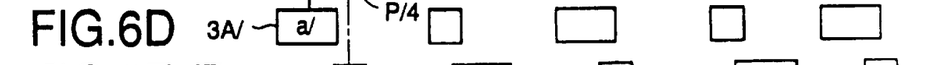
Figure 6E:
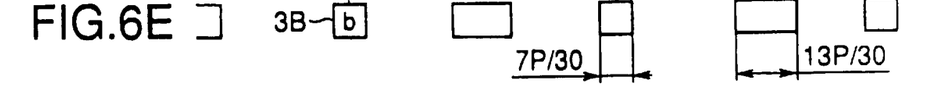

It is possible to reduce the distorted components of the seventh order in the signals containing no distorted components of the third and fifth orders which are obtained with the photo detecting devices having the width shown in FIGS. 6A to 6E by using, in place of the light receiving section 30 shown in FIG. 6A, photo detecting devices (not shown) which are composed of divided elements, for example, 31a, 32a, 33a and 34a having widths of 17P/30, 23P/30, 11P/30 and 29P/30. Since an intensity of diffracted light of the seventh order is lowered in the diffracted lights received by the photo detecting devices, it is possible to reduce the distorted components of the seventh order included in the signal received by the light receiving section 30 by using a light receiving section 30 which is composed of the photo detecting devices in an optical encoder. Further, it is possible to further reduce the distorted components of the seventh order by selecting the widths of 17P/30, 23P/30, 11P/30 and 29P/30 for the photo detecting device composed, for example, of the divided photo detecting devices 31a and 32a contained in the light receiving section 30 and arranging these elements at a ratio of 2:1. These combinations have been selected by calculating numerical values of Fourier coefficients of patterns. As far as effects such as those described above are obtainable, it is possible to use other combinations of the photo detecting devices which have the different pattern widths or combinations of the photo detecting devices which reduce the distorted components of a different order (for example, eleventh order).

Figure 7A:
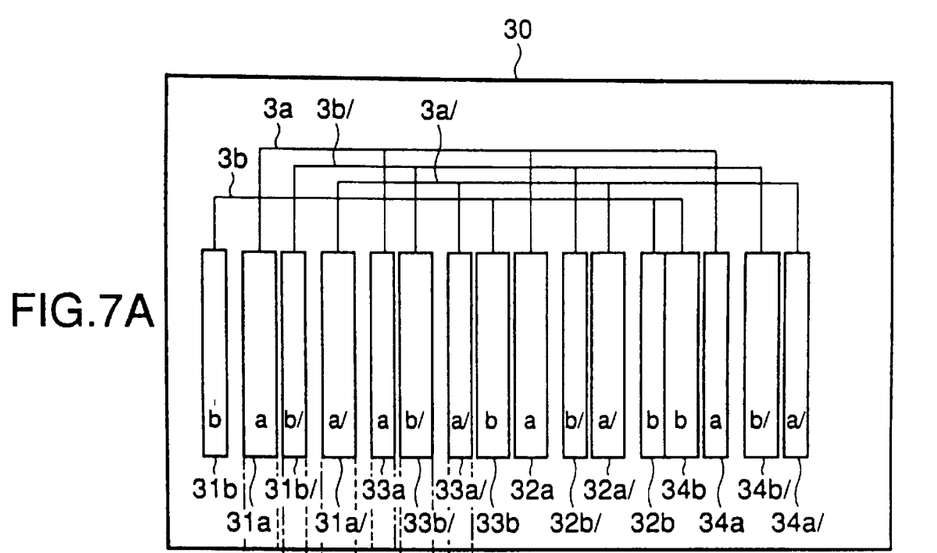
FIGS. 7A to 7E are diagrams showing a third example of a light receiving section used in the embodiment shown in FIG. 3.
Figures 7B, 7C:
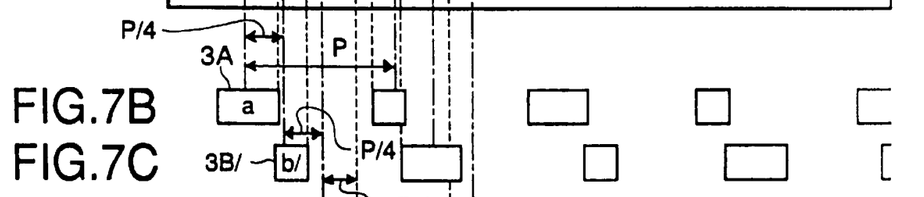
Figures 7D, 7E:
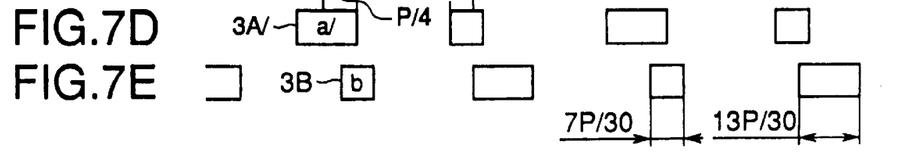

A third embodiment will be described next. In an optical encoder preferred as the third embodiment, the light receiving section 3 of the first embodiment is replaced with an improved light receiving section 30 which is shown in FIG. 7A. In the third embodiment, an order for mixing the four phases is set so that the photo detecting devices have areas at a ratio higher than that in the second embodiment shown in FIGS. 6A to 6E. Therefore, a light receiving efficiency relative to an amount of emitted light is further enhanced, thereby lowering electric power consumption.

Figure 8:
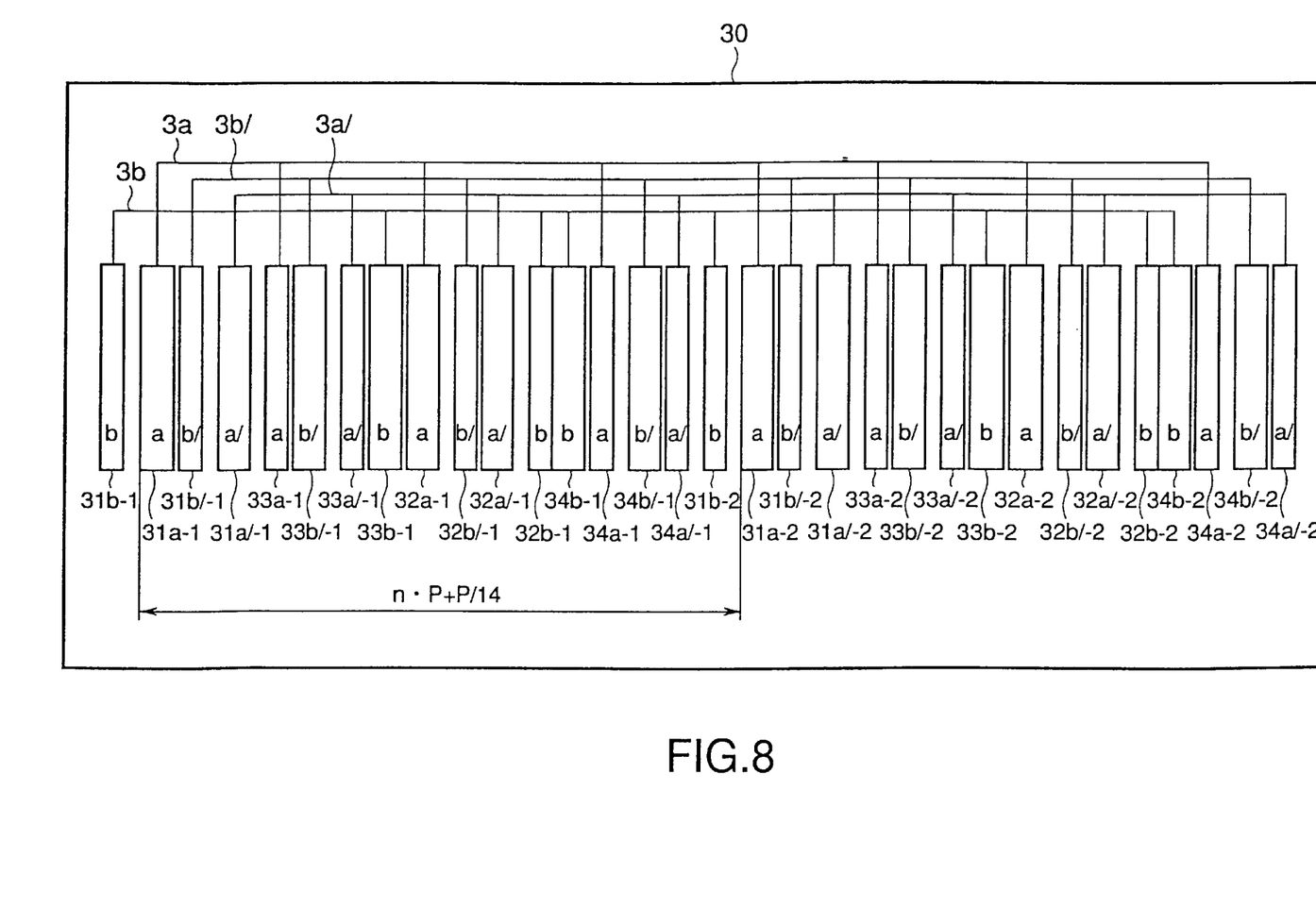
FIG. 8 is a diagram showing a fourth example of a light receiving section used in the embodiment shown in FIG. 3.

A fourth embodiment which is obtained by further improving the embodiment described with reference to FIGS. 6A to 6E will be explained with reference to FIG. 8.

In the embodiment shown in FIGS. 6A to 6E, the photo detecting devices each included two divided photo detecting elements shown in FIG. 6A are arranged at intervals which are integral times of P. In the fourth embodiment, in contrast, patterns each including two divided photo detecting elements are arranged at intervals which are not constant. Photo sensors 31a-1, 32a-1, 33a-1 and 34a-1 shown in FIG. 8 are arranged so as to be shifted from the locations of the photo detecting devices 31a-2, 32a-2, 33a-2 and 34a-2 at a distance which is an integral times of P. In other words, the photo detecting devices 31a-1, 32a-1, 33a-1 and 34a-1 have a phase difference of P/14. Due to this phase difference of P/14, the photo detecting device patterns are arranged so that the distorted components of the seventh order of the photo detecting device patterns 31a-1, 32a-1, 33a-1 and 34a-1 have phases reverse to those of the photo detecting device patterns 31a-2, 32a-2, 33a-2 and 34a-2, whereby the distorted components of the seventh order are cancelled with each other.

Due to this cancellation combined with the effect obtained by the widths of the photo detecting devices, the fourth embodiment provides a phase signal "a" from which the distorted components of the third, fifth and seventh orders have been eliminated. The distorted components have been eliminated similarly from the phase signals having phases b, a/ and b/. Further, it is possible to eliminate not only the distorted components of the seventh order but also the distorted components of an optional C order. For this purpose, it is sufficient to reserve a phase difference of $P/(2 \cdot c)$ between the group of the photo detecting devices 31a-1, 32a-1, 33a-1, 34a-1 and the group of the photo detecting devices 3a-2, 32a-2, 33a-2, 34a-2. Further, the arranging order of the photo detecting devices in the right-to-left direction selected for the fourth embodiment is not limitative and the photo detecting devices may be arranged in any order as long as the combinations described above are included. Furthermore, a photo detecting device which includes two divided elements, for example 31a and 32a, may have an optional width, and it is possible to eliminate the distorted components of two optional orders at the same time as long as the width satisfies the numerical formula mentioned above.

Though not shown in the accompanying drawings, the light receiving section 30 of the four the embodiment can be further improved by arranging the photo detecting devices so as to be shifted by a distance of P/22 from the positions of the photo detecting devices 31a-1, 32a-1, 33a-1, 34a-1, 31a-2, 32a-2, 33a-2 and 34a-2. This phase difference P/22 allows the photo detecting device patterns to be arranged so that the distorted components of the eleventh order have phases reverse to each other and are cancelled. When the photo detecting devices are arranged as described above, the fourth embodiment provides signals in which the distorted components of the third and fifth orders (a=3, b=5) are eliminated by the widths of the photo detecting devices and the distorted components of the seventh and eleventh orders (c=7, d=11) are eliminated by the intervals among the photo detecting devices. The distorted components which can be eliminated are not limited to those mentioned above, but optional orders are selectable as the a, b, c and d orders.

For eliminating the distorted components of the thirteenth order, it is sufficient to adopt e=13 and arrange the photo detecting device groups at intervals corresponding to a phase difference of $P/(2 \cdot 13)$, or P/26. For eliminating the distorted components of the seventeenth and twenty-third orders, it is similarly sufficient to adopt f=17 and g=21, and arrange the photo detecting device groups so as to reserve the phase differences of $P/(2 \cdot 17)$ and $P/(2 \cdot 23)$. In these cases, it is unnecessary to form patterns for eliminating the distorted components of the ninth, fifteenth and twenty-first orders, since these components contain the components of the third order as their factors and are eliminated by the pattern formed for eliminating the distorted components of the third order.

In the embodiments described above, the photo detecting device which is composed of two divided elements, for example, 31a and 32a may have a constant width of P/2 and the distorted components of the third, fifth, seventh, eleventh, . . . orders can be eliminated by arranging the photo detecting devices so as to shift the phases.

The photo detecting devices may be arranged in the light receiving section in a condition where they are further divided. For example, each of the photo detecting devices may be divided into three or five. For enhancing environmental resistance, the light receiving section 3 may be molded with a resin, packed in a can or accommodated in a package made of a ceramic or metal material. Light receiving surfaces may be protected with a glass or resin material.

Though modulation examples of widths and periods in the light receiving section 3 are adopted as methods for eliminating the distorted components of displacement signals in the embodiments described above, these methods may be adopted for the first grating. In such cases, the first grating may be an amplitude modulation grating or a phase grating. Though modulations of the widths and periods of patterns have been exemplified above, it is possible to modulate widths and periods of areas which are not patterns. Modulations may be effected on shapes of the photo detecting devices or other factors. The elimination of the distorted components of high orders by the modulation of the photo detecting devices is applicable for eliminating the distorted components of orders other than those described with reference to the embodiments of the present invention, i.e., a plurality of combinations of the distorted components of odd orders such as; the third, fifth, seventh, eleventh and thirteenth orders, the distorted components of a specific order, the distorted components of the second order or distorted components of even orders. Since the distorted components of the even orders can be eliminated by generating displacement signals which are different by 180 degrees in their phases and signals which are reversed so as to obtain their differences, these components may be eliminated on a level of the displacement signals. A reflective diffraction grating may be used as the first grating. A coherent light emitted from a laser diode or an incoherent light emitted from an LED may be used. The light may be parallel or not parallel.

Moreover, the present invention is applicable to rectilinear and rotary encoders. In addition, the present invention is applicable also to encoders which comprise phase gratings disposed around cylindrical members and which utilize Talbot interference. The present invention is applicable in cases where ratios of the photo detecting devices in the first gratings relative to average pitches of the photo detecting devices in light receiving sections are 1:1, 1:2 and others, and not limited to the embodiments described above.

As understood from the foregoing description, the optical encoder according to the present invention, which comprises fine photo detecting devices for four phases are mixed in a minute section, equalizes influences among different phases and does not allow output signals to be unbalanced should stains, damage or errors be caused on a scale at intervals, for example, close to a pitch on a scale, thereby preventing errors from being produced in positional detection. Further, since fine divided photo detecting devices which have two widths are configured to eliminate distorted components of the third and fifth orders at th e same time, the optical encoder is capable of providing pure sinusoidal signals with a remarkably high averaging effect, and due to a multiplicative effect obtained with the mixing of the photo detecting devices for the four phases, the optical encoder according to the present invention enhances the averaging effect and is providing stable detection signals. Since the optical encoder according to the present invention can detect positions with high accuracy and high stability in spite of outer factors, the encoder makes it possible to carry out high precision work easily, thereby enhancing production efficiencies.

What is claimed is:

1. An optical encoder for detecting relative displacement, said optical encoder comprising:

a scale, having a periodic pattern, capable of passing light;

a light receiving section operable to receive the light passed through said scale, wherein at least part of said light receiving section is operable to move relative to said scale;

a plurality of photodetecting device groups, including at least a first and a second photodetecting device group, located on said light receiving section, wherein each photodetecting device group includes a respective plurality of photodetecting devices, each operable to detect the light and output a respective signal indicative of the detected light, arranged in a pattern corresponding to said periodic pattern of said scale and each photodetecting device group corresponds to a respective predetermined phase;

wherein said photodetecting devices of said first group and said photodetecting devices of said second group are arranged side by side in a mixed fashion along a lengthwise direction of said light receiving section much that the signals outputted by said photodetecting devices of said first group have a predetermined phase difference with respect to the signals outputted by said photodetecting devices of said second group, and said photodetecting devices of said first group have a total combined width W and are divided and arranged at a predetermined distance from each other, and an overall pattern of said photodetecting devices of said plurality of photodetecting device groups is determined such that Fourier components of high orders are eliminated in the signals outputted by said photodetecting devices of said plurality of photodetecting device groups.

2. An optical encoder as claimed in claim 1, wherein the total combined width W of said photodetecting devices of sail first group is determined according to:

W=p×(n/a±(1+2m)/2b), where P represents a signal period, n and m are integers, and a and b are orders of Fourier components which are to be eliminated in the signals outputted by said photodetecting devices of said plurality of photodetecting device groups.

3. An optical encoder as claimed in claim 1, wherein:

the total combined width W of said photodetecting devices of said first group is determined according to:

W=P×(n/a±(1+2m)/2b), where P represents a signal period, n and m are integers, and a and b are orders of Fourier components which are to be eliminated in the signals outputted by said photodetecting devices of said plurality of photodetecting device groups; and said photodetecting devices of at least one of said photodetecting device groups are arranged at intervals which are not constant, wherein at least some of said photodetecting devices are arranged so as to be shifted by distances of P/(2c), P/(2d) and P/(2c)+P/(2d) from k×P, where k represents a positive integer, P represents a signal period, a location of a photodetecting device is a reference for the distances, and c and d are orders of Fourier components which are to be eliminated in the signals outputted by said photodetecting devices of said plurality of photodetecting device groups.

4. An optical encoder for detecting relative displacement, said optical encoder comprising:

a scale, having a periodic pattern, capable of passing light;

a light receiving section operable to receive the light passed through said scale, wherein at least part of said light receiving section is operable to move relative to said scale;

a plurality of photodetecting device groups, including at least a first and a second photodetecting device group, located on said light receiving section, wherein each photodetecting device group includes a respective plurality of photodetecting devices, each operable to detect the light and output a respective signal indicative of the detected light, arranged in a pattern corresponding to said periodic pattern of said scale and each photodetecting device group corresponds to a respective predetermined phase;

wherein said photodetecting devices of said first group and said photodetecting devices of said second group are arranged side by side in a mixed fashion along a lengthwise direction of said light receiving section such that the signals outputted by said photodetecting devices of said first group have a predetermined phase difference with respect to the signals outputted by said photodetecting devices of said second group, and said photodetecting devices of at least one of said photodetecting device groups are arranged at intervals which are not constant, wherein at least some of said photodetecting devices are arranged so as to be shifted by distances of $P/(2c)$, $P/(2d)$ and $P/(2c)+P/(2d)$ from $k \times P$, where k represents a positive integer, P represents a signal period, a location of a photodetecting device is a reference for the distances, and c and d are orders of Fourier components which are to be eliminated in the signals outputted by said photodetecting devices of said plurality of photodetecting device groups such that an overall pattern of said photodetecting devices of said plurality of photodetecting device groups is determined which eliminates Fourier components of high orders in the signals outputted by said photodetecting devices of said plurality of photodetecting device groups.

* * * * *